United States Patent [19]
Toni et al.

[11] Patent Number: 5,455,096
[45] Date of Patent: Oct. 3, 1995

[54] COMPLEX COMPOSITE SANDWICH STRUCTURE HAVING A LAMINATE AND A FOAMING ASHESIVE THEREIN AND A METHOD FOR MAKING THE SAME

[75] Inventors: Darryl M. Toni, Madison; William V. Forster, Seymour; Kenneth Nowak, Easton, all of Conn.

[73] Assignee: United Technologies Corporation, Hartford, Conn.

[21] Appl. No.: 124,096

[22] Filed: Sep. 20, 1993

[51] Int. Cl.⁶ .............................. B32B 3/12; B32B 31/06
[52] U.S. Cl. ...................... 428/116; 428/117; 428/118; 156/197; 156/228
[58] Field of Search .................................. 428/116, 117, 428/118; 156/228, 197

[56] References Cited

U.S. PATENT DOCUMENTS

| | | | |
|---|---|---|---|
| 2,654,686 | 10/1953 | Hansen | 428/116 |
| 4,335,174 | 4/1982 | Belko | 428/73 |
| 5,034,256 | 7/1991 | Santiso et al. | 428/73 |
| 5,106,668 | 4/1992 | Turner et al. | 428/116 |

FOREIGN PATENT DOCUMENTS

| | | |
|---|---|---|
| 1184106 | 3/1985 | Canada . |
| 0047229 | 8/1981 | European Pat. Off. . |
| 2240815 | 3/1975 | France . |

*Primary Examiner*—William P. Watkins, III

[57] ABSTRACT

A composite sandwich structure which includes upper and lower skin structures, first and second honeycomb core structures, and an intermediate portion disposed between the first and second honeycomb core structures. The intermediate portion comprises a composite laminate, a barrier member and a foaming adhesive layer disposed between the composite laminate and the barrier member. The foaming adhesive layer is of a type designed to expand when exposed to an elevated temperature. The composite laminate and the barrier member operate to limit the expansion of the foaming adhesive layer into the open cells of the first and second honeycomb core structures. The foaming adhesive layer, upon expansion, applies pressure against the composite laminate. This pressure, acting concomitantly with the applied curing pressure and the elevated temperature, cures the laminate. Furthermore, the expansion of the foaming adhesive urges the composite laminate and the barrier member apart so as to fill any core discrepancies, i.e., mistrimmed or damaged core, that may exist in the honeycomb core structures.

20 Claims, 4 Drawing Sheets

COMPLEX COMPOSITE SANDWICH STRUCTURE HAVING A LAMINATE AND A FOAMING ASHESIVE THEREIN AND A METHOD FOR MAKING THE SAME

TECHNICAL FIELD

The present invention relates to composite manufacturing and, more particularly, to an improved method for curing composite laminates disposed between honeycomb core structures.

BACKGROUND OF THE INVENTION

The use of composite materials in modern vehicles has expanded in recent years inasmuch as composite materials provide a relatively strong structure without the weight penalty that is associated with their metallic counterparts. Composite sandwich panels, which consist of upper and lower skin structures affixed to a core structure, are used extensively as an efficient method for transferring axial, bending, and shear loads. The upper and lower skin structures of the sandwich panel are typically fabricated from fiber reinforced resin matrix material and are designed to carry the axial and bending loads. The core structure is designed to carry the transverse shear loads and is usually a honeycomb structure, which comprises an array of cells defined by an associated plurality of cell walls.

A simple composite sandwich panel is fabricated by compacting and curing the upper and lower skin structures to a single honeycomb core structure in one step. The step of compaction removes air pockets that may be trapped between the skin structures and the core. Compaction is achieved by placing the structures on a mold surface, disposing a vacuum bag over the structures and sealing the bag to the mold, and then applying a vacuum to the assembly. The curing process involves placing the compacted assembly in an autoclave and applying pressure to the assembly while exposing the same to an elevated temperature. In order for the panel to cure correctly, the applied curing pressure must transfer completely through the assembly so as to urge the skin structures to bond to the honeycomb core structure. For a simple sandwich panel, the pressure that is applied to the upper and lower skin structures is reacted by the cell walls of the honeycomb core structure. The process of curing skin structures and honeycomb core structures in one step is known as co-curing and provides a simple yet rigid sandwich panel.

Some structural designs, however, require the incorporation of an internal or intermediate composite laminate of fiber reinforced resin matrix material between two honeycomb core structures. For instance, the RAH-66 Comanche aircraft utilizes lightly loaded sandwich panels on many external surfaces. These panels are designed to carry or react the airloads which are applied to the aircraft during flight and, therefore, a single honeycomb panel typically provides sufficient strength. However, certain portions of the panel require additional stiffness in order to support locally high loads which are applied, e.g., walking loads, attachment loads, etc. Referring to FIG. 1a, additional stiffness may be provided by bonding a second honeycomb structure directly to the first structure. This is achieved either by separately curing the panels then bonding them together or, more preferably, by co-curing the panels together in a single step.

Additional stiffness may also be provided by locally increasing the thickness of the skin structures. FIG. 1b illustrates an internal attachment point on a honeycomb panel. The primary deficiency with this arrangement is that the applied fitting load, $F_{fitting}$, transfers to the core as a peel load. The allowable peel strength of a honeycomb panel is relatively low as compared to its shear strength and, therefore, such an attachment would not be adequate. FIG. 1c illustrates an improved internal attachment point. The applied fitting load is reacted by the inner and outer skin structures and transfers to the core as shear. The main deficiency with this type of design is that the external surface will no longer be smooth, thus adversely affecting the low observable characteristics of the airframe as well as the aerodynamic flow along the airframe surface. In order to alleviate these concerns, an additional honeycomb panel is affixed on the external surface over the attachment point. The additional honeycomb panel may be cured separately from the first honeycomb structure then bonded thereto, however, it is more preferable to co-cure the two panels in a single step.

The foregoing complex composite sandwich structures have, to date, been difficult to manufacture using a co-curing process inasmuch as the precise location of the first and second honeycomb structures is required to adequately transfer the applied curing pressure through the cell walls to the intermediate composite laminate. FIG. 1d illustrates the problem associated with improper placement of the honeycomb structures. The intermediate laminate is not shown in order to illustrate that the curing pressure will only transfer to the intermediate laminate as point loads at the intersection 10 of the cell walls of the upper and lower honeycomb core structures 12,14. This type of loading does not adequately pressurize the intermediate laminate during curing, hence, yielding a deficient part. Precise placement of honeycomb structures on the intermediate composite laminate is an exceedingly difficult process requiring exact trimming of the honeycomb core. Moreover, proper placement of the honeycomb structures prior to curing does not guarantee that the honeycomb core structures will not shift during the actual curing process. Additionally, if the honeycomb core is trimmed incorrectly or has been damaged during the fabrication process such that a depression is formed thereon, the applied curing pressure, $P_{applied}$, will transfer to only one side of the intermediate laminate, resulting in a 'bridging' of the depression as shown in FIGS. 1e,f.

A need therefore exists for an improved co-curing process for fabricating a composite sandwich structure having an intermediate composite laminate disposed between two honeycomb core structures.

SUMMARY OF THE INVENTION

An object of the present invention is to provide a composite sandwich structure having first and second honeycomb core structures and an intermediate portion disposed therebetween.

Another object of the present invention is to provide a method for forming a composite sandwich structure which includes an intermediate portion disposed between two honeycomb core structures.

These and other objects are achieved through the composite sandwich structure of the present invention which includes upper and lower skin structures, first and second honeycomb core structures, and an intermediate portion disposed between the first and second honeycomb core structures. The upper and lower skin structures are, respectively, bonded to the first and second honeycomb core structures. Each of the honeycomb core structures comprises an array of continuous, polygon shaped open cells defined by an associated plurality of cell walls. The intermediate portion comprises a composite laminate, a barrier member and a foaming adhesive layer disposed between the composite laminate and the barrier member. The foaming adhesive layer is of a type designed to expand when exposed to an elevated temperature. The composite laminate and the barrier member operate to limit the expansion of the foaming adhesive layer into the open cells of the first and second honeycomb core structures.

The foaming adhesive layer, upon expansion, applies pressure against the composite laminate. This pressure, acting concomitantly with the applied curing pressure and the elevated temperature, cures the laminate. Furthermore, the expansion of the foaming adhesive urges the composite laminate and the barrier member apart so as to fill any core discrepancies, i.e., mistrimmed or damaged core, that may exist in the honeycomb core structures. The resulting panel is structurally superior to panels fabricated by prior art methods.

In further accord with the present invention, the composite sandwich structure may be fabricated by placing the outer skin structure on a first mold member of a mold assembly, the first member having a contour which defines the external surface of the panel. The first honeycomb core structure is disposed on the outer skin structure. The intermediate portion is formed on the first honeycomb core structure by placing the composite laminate over at least a portion of the first honeycomb core structure. A layer of foaming adhesive is disposed on at least a portion of the composite laminate. A barrier member is placed over the foaming adhesive layer so as to minimize the expansion of the foaming adhesive into the open cells of the second honeycomb core structure which is next placed on the barrier member. The inner skin structure is then disposed on the second honeycomb core structure to form a sandwich structure assembly.

A second mold member of the mold assembly is disposed over the sandwich structure assembly. The second mold member is locally stiffened through the incorporation of rigidizing plies of material. The local stiffening of the second mold member reduces the amount of autoclave curing pressure that is applied to the ramped or beveled portions of the honeycomb core structures, thus reducing the likelihood of core crushing.

The sandwich structure assembly is placed in an autoclave and exposed to an elevated temperature and pressure to cure the assembly. During the curing process, the foaming adhesive layer will expand to fill any voids that may have existed between the honeycomb core structures due to mistrimming. The composite laminate and the barrier member will act to minimize the expansion of the foaming adhesive into the open cells of the first and second honeycomb core structures.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF THE PREFERRED EMBODIMENT

Figure 1A:
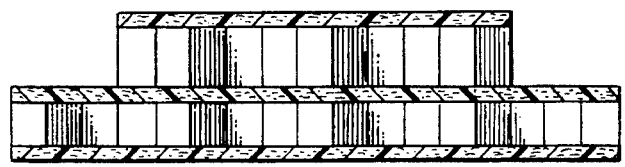
FIG. 1a is a cross sectional view of one embodiment of a complex composite sandwich structure having an intermediate laminate disposed between two honeycomb core structures.
Figure 1B:
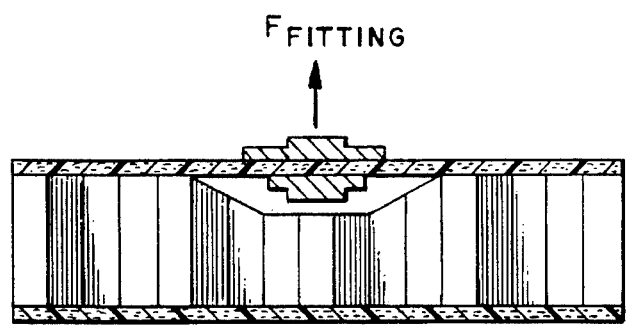
FIG. 1b is a cross sectional view of a simple honeycomb sandwich structure with a fitting attached thereto.
Figure 1C:
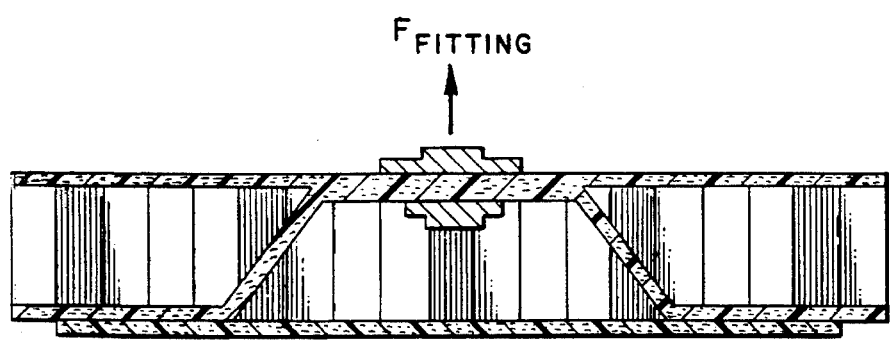
FIG. 1c is a cross sectional view of a complex composite sandwich structure illustrating a preferred attachment arrangement according to the present invention.
Figure 1D:
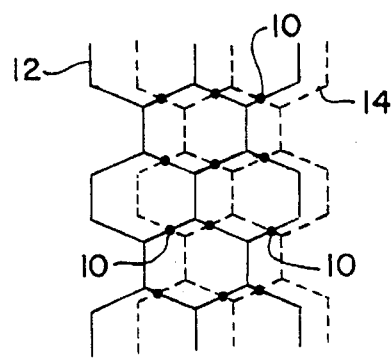
FIG. 1d illustrates the point loads which are applied to an intermediate laminate when the honeycomb core structures are improperly placed.
Figure 1E:
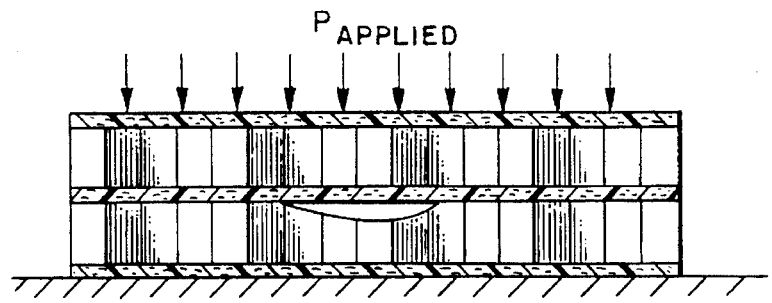
FIG. 1e is a cross sectional view of one embodiment of a complex composite sandwich structure formed utilizing a prior art method.
Figure 1F:
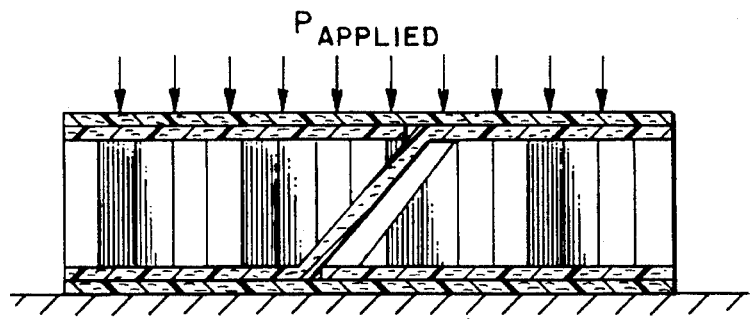
FIG. 1f is a cross sectional view of a second embodiment of a complex composite sandwich structure formed utilizing a prior art method.
Figure 2A:
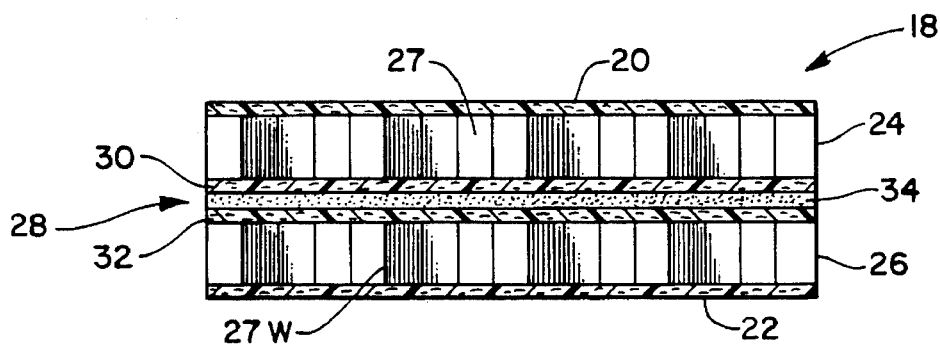
FIG. 2a is a cross sectional view of one embodiment of a complex composite sandwich structure made according to the present invention.
Figure 2B:
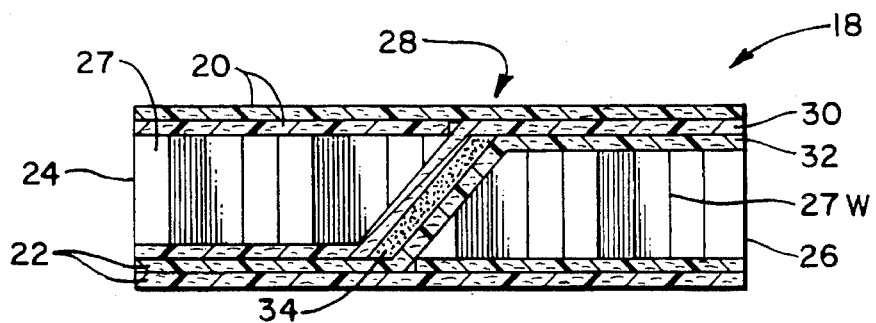
FIG. 2b is a cross sectional view of a second embodiment of a complex composite sandwich structure made according to the present invention.

Referring now to the drawings wherein like reference numerals illustrate corresponding or similar structures, FIGS. 2a,b depict cross sectional views of a complex composite sandwich structure 18 according to the present invention. The complex composite sandwich structure comprises upper and lower skin structures 20,22, first and second honeycomb core structures 24,26 and an intermediate portion 28, disposed between the first and second honeycomb core structures 24,26. The upper and lower skin structures 20,22 are, respectively, bonded to the first and second honeycomb core structures 24,26. Each of the honeycomb core structures comprises an array of continuous, polygon shaped open cells 27 defined by an associated plurality of cell walls $27_w$. The intermediate portion 28 comprises a composite laminate 30, a foaming adhesive layer 34, and a barrier member 32. The foaming adhesive layer 34 is of a type designed to expand when exposed to an elevated temperature. The composite laminate 30 and the barrier member 32 operate to limit the expansion of the foaming adhesive layer 34 into the open cells of the first and second honeycomb core structures 24,26.

Figure 3A:
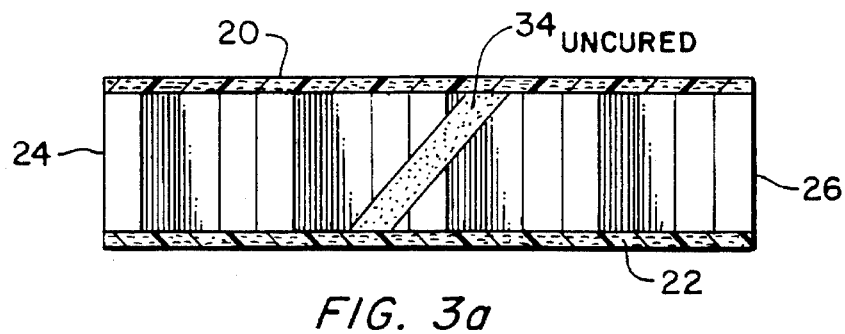
FIGS. 3a, and 3b are examples of one bonding method in accordance with the present invention.
Figure 3B:
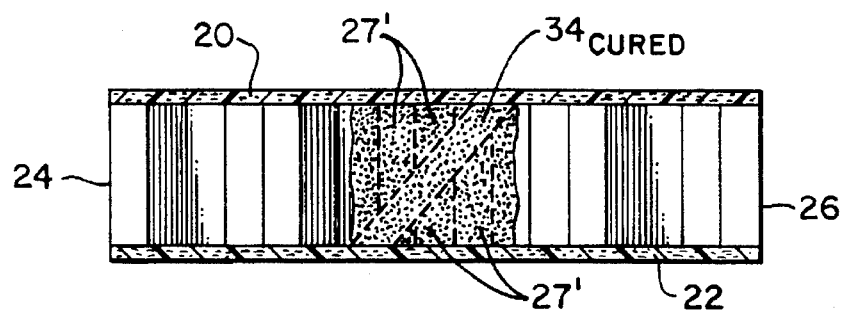

FIGS. 3a,b show the effect of a foaming adhesive layer 34 on open cell honeycomb core. FIG. 3a is a cross sectional view showing first and second honeycomb core structures 24,26 with a layer of uncured foaming adhesive $34_{uncured}$ disposed therebetween. FIG. 3b is a cross sectional view of the structure showing the expanded foaming adhesive layer $34_{cured}$ after being exposed to an elevated temperature. The expanded foaming adhesive layer $34_{cured}$ fills several cells 27' of the first and second honeycomb core structures 24,26. While this provides additional stiffness to the honeycomb core structures 24,26, it also results in a reduction in the mechanical properties of the foaming adhesive layer 34 and adds a substantial amount of additional weight.

Referring back to FIGS. 2a,b, in order to minimize the expansion of the foaming adhesive layer 34 during curing, the uncured foaming adhesive layer $34_{uncured}$ is disposed between a composite laminate 30 and a barrier member 32. The composite laminate 30 and the barrier member 32 minimize the expansion of the foaming adhesive layer $34_{cured}$ into the open cells of the honeycomb core structures 24,26, thereby yielding a panel having improved structural properties.

Figure 4A:
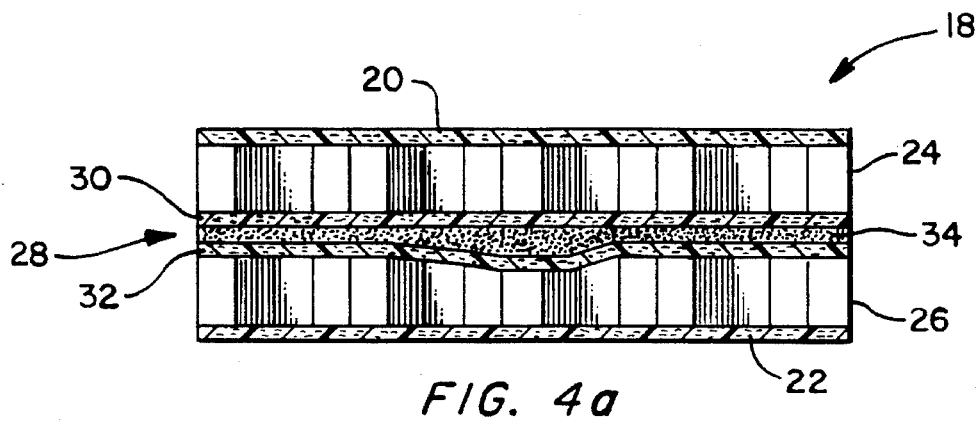
FIG. 4a is a cross sectional view of one embodiment of a complex composite sandwich structure made according to the present invention illustrating the effect of the invention on damaged honeycomb core.
Figure 4B:
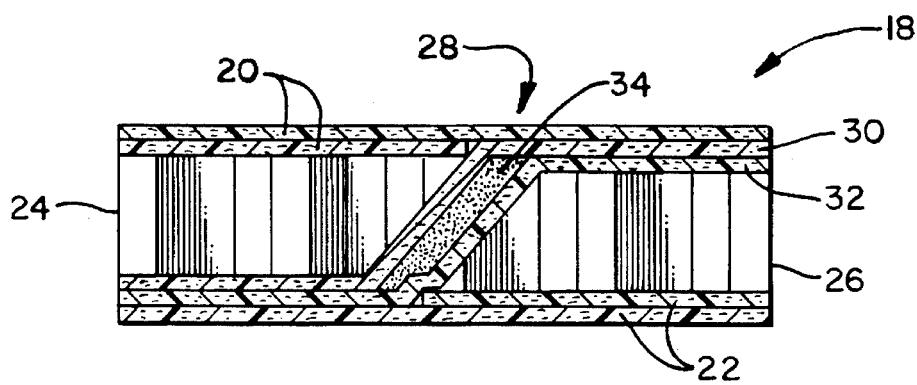
FIG. 4b is a cross sectional view of a second embodiment of a complex composite sandwich structure made according to the present invention illustrating the effect of the invention on mistrimmed honeycomb core.

The foaming adhesive layer 34, upon expansion, applies pressure against the composite laminate 30. This pressure, acting concomitantly with the applied curing pressure and the elevated temperature, cures the laminate 30. Furthermore, referring to FIGS. 4a,b, the expansion of the foaming adhesive 34 urges the composite laminate 30 and the barrier member 32 apart so as to fill any core discrepancies, i.e., mistrimmed or damaged core, that may exist in the honeycomb core structures. The resulting panel is structurally superior to panels fabricated by prior art methods.

In the preferred embodiment, the upper and lower skin structures 20,22 each comprise at least one ply of high strength fiber reinforced resin matrix composite material such as graphite, fiberglass or an aromatic polyamide material such as KEVLAR® (a registered trademark of E.I. DuPont De Nemours & Co., of Wilmington, Del.), preimpregnated with a resin, preferably an epoxy. More preferably, the skin structures each comprise two plies of woven KEVLAR/epoxy. The first and second honeycomb core structures 24,26 may be fabricated from aluminum, ceramic, fiberglass, or phenolic resin material such as NOMEX® (a registered trademark or E.I. DuPont De Nemours & Co.). In the preferred embodiment, the honeycomb core structures are made from NOMEX material having a 1.8 pound per cubic foot density. The composite laminate 30 comprises at least one ply of fiber-reinforced resin matrix composite material 30 such as graphite/epoxy, fiberglass/epoxy, or polyamide/epoxy and, more preferably, is one ply of woven KEVLAR/epoxy material. The foaming adhesive layer 34 is preferably made from FM 410 adhesive foam (a registered trademark of CYTEC Engineered Materials Inc.) FM 410 adhesive foam is a non-asbestos, modified epoxy foaming adhesive which is designed to expand when exposed to an elevated temperature and which is manufactured by and a trademark of CYTEC Engineered Materials Inc. of Havre DeGrace, Md. The barrier member 32 may be fabricated from either a layer of structural adhesive film, such as M1146 epoxy film adhesive manufactured by and a trademark of BASF of Anaheim, Calif. or, more preferably, from at least one ply of high strength, fiber reinforced resin matrix composite material such as graphite/epoxy, fiberglass/epoxy, or polyamide/epoxy. In the preferred embodiment, the barrier member 32 comprises one ply of a woven KEVLAR/ epoxy material.

Figure 5:
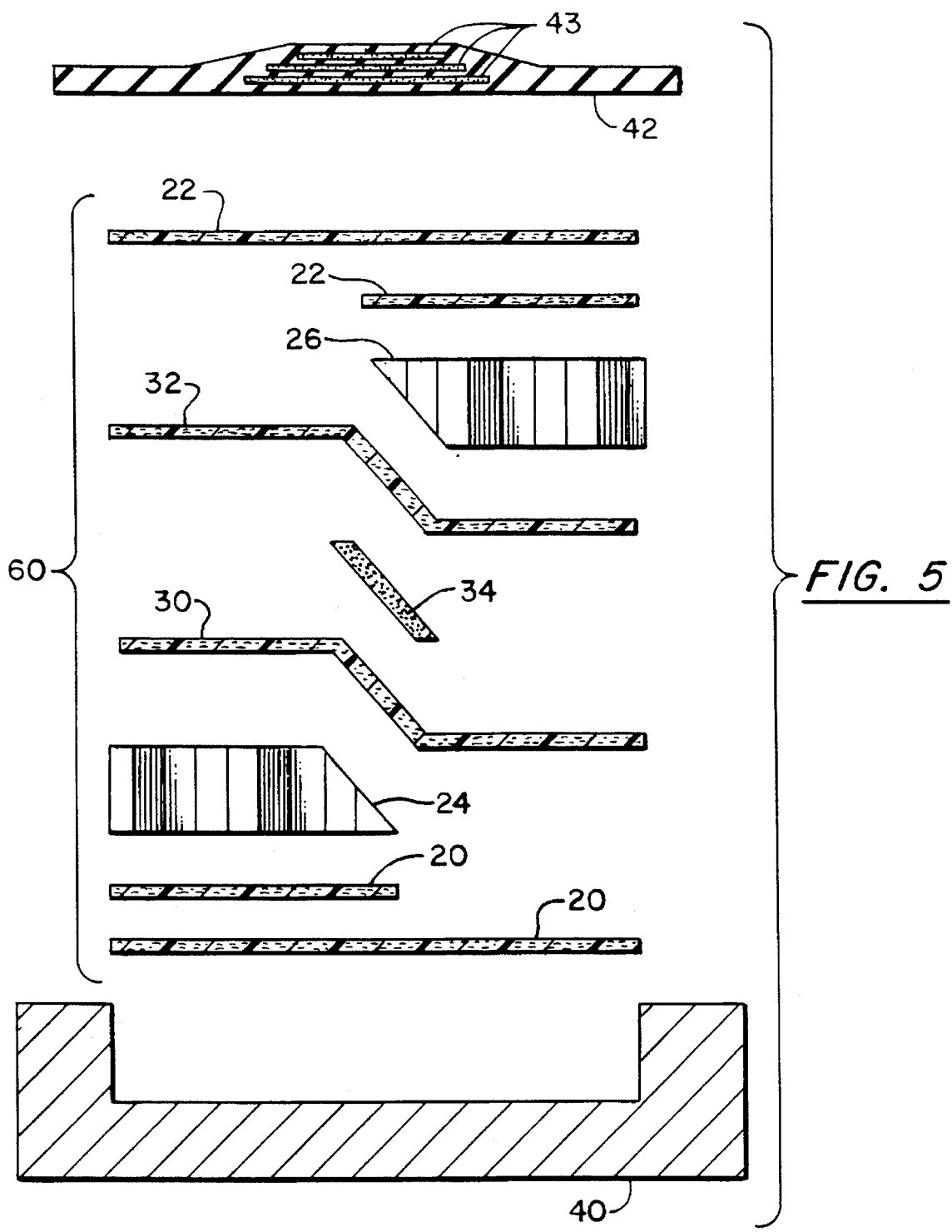
FIG. 5 illustrates a cross sectional view of a complex composite sandwich structure under fabrication in accordance with the method for making the present invention.

Referring to FIG. 5, the preferred embodiment described hereinabove is fabricated by placing the outer skin structure 20 on a first mold member 40 of a mold assembly, the first mold member having a contour which defines the external surface of the panel. If a smooth external surface is desired, it is preferable to cure the outer skin structure 20 prior to disposing the same on the mold 40. However if a single co-curing process is desired, than the outer skin structure 20 may be placed on the first mold member as uncured material, however, the resulting outer skin structure 20 may experience some dimpling during the curing process.

The first honeycomb core structure 24 is disposed on the outer skin structure 20. The intermediate portion 28 is formed on the first honeycomb core structure 24 by placing the composite laminate 30, comprising at least one ply of fiber-reinforced resin matrix composite material, over the first honeycomb core structure 24. A layer of foaming adhesive 34 is disposed on the composite laminate 30, the layer having a thickness in a range from about 0.010 inches to about 0.050 inches and, more preferably, the thickness is about 0.025 inches. A barrier member 32 is placed over the foaming adhesive layer 34 so as to minimize the expansion of the foaming adhesive into the open cells of the second honeycomb core structure 26 which is next placed on the barrier member 32. The barrier member preferably comprises at least one ply of fiber reinforced resin matrix composite material such as a woven KEVLAR/epoxy. The inner skin structure 22 is then disposed on the second honeycomb core structure 26 to form a sandwich structure assembly 60.

A second mold member 42 of the mold assembly is utilized in the manufacturing process to cure the assembly 60. The second mold member 42 is made from silicone, such as flouroelastomer, which is locally stiffened through the incorporation of rigidizing plies 43 of material. The local stiffening of the second mold member 42 is required so as to reduce the amount of autoclave curing pressure that is applied to the ramped or beveled portions of the honeycomb core structures 24,26, thus reducing the likelihood of core crushing. The rigidizing plies may be made from graphite, aluminum, fiberglass, or aromatic polyamide material and, in the preferred embodiment, are made from fiberglass material. The second mold member 42 is disposed over the assembly 60 and functions like a beam on an elastic foundation to absorb any tolerance mismatch that may exist between the first and second honeycomb core structures 24,26 or between the second mold member 42 and the assembly 60. Furthermore, the second mold member 42 is configured so as to distribute the applied curing pressure across the entire assembly 60.

The assembly 60 is placed in an autoclave (not shown) and exposed to an elevated temperature and pressure. In particular, the assembly 60 is exposed to about 350 degrees F. and a pressure of approximately 25 psi for about 1.5 to 2 hours. During the curing process, the foaming adhesive layer 34, will expand to fill any voids that may have existed between the honeycomb core structures 24,26 due to mistrimming. The composite laminate 30 and the barrier member 32 will act to minimize the expansion of the foaming adhesive into the open cells of the first and second honeycomb core structures 24,26.

While the method for manufacturing the preferred embodiment has been described as a co-curing process utilizing inner and outer skin structures, it should be understood and appreciated that the honeycomb core structures may be bonded to the intermediate laminate without the need for inner and outer skin structures. A variety of modifications and variations of the present invention are possible in light of the above teachings. It is therefore to be understood that, within the scope of the appended claims, the present invention may be practiced otherwise than as specifically described hereinabove.

We claim:

1. A method for forming a composite sandwich structure having first and second honeycomb core structures and an intermediate portion disposed therebetween, the composite sandwich structure being formed within a mold assembly, the mold assembly having first and second mold members, wherein the method comprises the steps of:

placing a first honeycomb core structure having a plurality of open cells on the first mold member of the mold;

forming an intermediate portion on said open cells of said first honeycomb core structure, said intermediate portion comprising a composite laminate, a barrier member, and a foaming adhesive layer disposed between said composite laminate and said barrier member;

placing a second honeycomb core structure having a plurality of open cells on said intermediate portion such that said open cells of said second honeycomb core structure are disposed on said intermediate portion; and curing the resulting sandwich assembly.

2. The method for forming a composite sandwich structure according to claim 1 further comprising the steps of:

placing a first skin structure on the first mold member of the mold, said first skin structure being disposed between said first honeycomb core structure and the first mold member; and disposing a second skin structure on said second honeycomb core structure.

3. The method for forming a composite sandwich structure according to claim 2 further comprising the step of disposing the second mold member of the mold assembly over said second skin structure.

4. The method for forming a composite sandwich structure according to claim 1 wherein said barder member of said intermediate portion comprises a layer of film adhesive.

5. The method for forming a composite sandwich structure according to claim 1 wherein said barder member of said intermediate portion comprises at least one ply of fiber reinforced resin matrix composite material.

6. The method for forming a composite sandwich structure according to claim 5 wherein the fiber of said barrier member is selected from the group consisting of graphite, fiberglass, quartz, and aromatic polyamide preimpregnated with resin.

7. The method for forming a composite sandwich structure according to claim 2 wherein the fiber of said first skin structure is selected from the group consisting of graphite, fiberglass, quartz and aromatic polyamide preimpregnated with resin.

8. The method for forming a composite sandwich structure according to claim 2 wherein the fiber of said second skin structure is selected from the group consisting of graphite, fiberglass, quartz and aromatic polyamide preimpregnated with resin.

9. The method for forming a composite sandwich structure according to claim 1 wherein the material of said first and second honeycomb core structures is selected from the group consisting of phenolic resin, fiberglass, ceramic and aluminum.

10. A complex composite sandwich structure comprising:

a first honeycomb core structure having a plurality of open cells;

a second honeycomb core structure having a plurality of open cells; and an intermediate portion disposed between said first and second honeycomb core structures, said open cells of said first and second honeycomb cores being disposed on said intermediate portion, said intermediate portion comprising a composite laminate, a barrier member, and a foaming adhesive layer disposed between said composite laminate and said barrier member.

11. The sandwich structure according to claim 10 further comprising first and second skin structures, said skin structures being made from fiber reinforced resin matrix composite material.

12. The sandwich structure according to claim 11 wherein the fiber of said skin structures is selected from the group consisting of graphite, fiberglass, quartz and aromatic polyamide preimpregnated with resin.

13. The sandwich structure according to claim 10 wherein the material of said first and second honeycomb core structures is selected from the group consisting of phenolic resin, fiberglass, ceramic and aluminum.

14. The sandwich structure according to claim 10 wherein said barrier member of said intermediate portion comprises a layer of film adhesive.

15. The sandwich structure according to claim 10 wherein said barrier member of said intermediate portion comprises at least one ply of fiber reinforced resin matrix composite material.

16. The sandwich structure according to claim 15 wherein the fiber of said barrier member is selected from the group consisting of graphite, fiberglass, quartz, and aromatic polyamide preimpregnated with resin.

17. A method for forming a composite sandwich structure having first and second honeycomb core structures and an intermediate portion disposed therebetween, the composite sandwich structure being formed through the application of curing pressure, the method comprising the steps of:

providing a mold assembly having first and second mold members, wherein at least one of said mold members comprises a flexible material at least a portion of which is rigidized for controlling the distribution of the applied curing pressure;

placing a first honeycomb core structure having a plurality of open cells on said first mold member of the mold;

forming an intermediate portion on said open cells of said first honeycomb core structure, said intermediate portion comprising a composite laminate, a barrier member, and a foaming adhesive layer disposed between said composite laminate and said barrier member;

placing a second honeycomb core structure having a plurality of open cells on said intermediate portion such that said open cells of said second honeycomb core structure are disposed on said intermediate portion;

placing said second mold member on the resulting sandwich assembly; and applying the curing pressure.

18. The method for forming a composite sandwich structure according to claim 17, wherein said flexible material of said at least one mold member is silicone.

19. The method for forming a composite sandwich structure according to claim 17, wherein said flexible material of said at least one mold member is flouroelastomer and wherein the rigidization of said at least one mold member is provided by means of rigidizing plies of material.

20. The complex composite sandwich structure of claim 11 wherein said intermediate portion contacts said first skin structure at a first location and contacts said second skin structure at a second location.

* * * * *